(12) United States Patent
Nieuwenhuis et al.

(10) Patent No.: US 12,480,484 B2
(45) Date of Patent: Nov. 25, 2025

(54) PUMP UNIT WITH CONICAL MOTOR CHAMBER

(71) Applicant: Power Packer North America, Inc., Westfield, WI (US)

(72) Inventors: Marcel Gerardus Maria Nieuwenhuis, Oldenzaal (NL); Johnny Antonius Jacobus Wiggemans, Oldenzaal (NL)

(73) Assignee: Power Packer North America, Inc., Westfield, WI (US)

( * ) Notice: Subject to any disclaimer, the term of this patent is extended or adjusted under 35 U.S.C. 154(b) by 751 days.

(21) Appl. No.: 17/642,660

(22) PCT Filed: Sep. 11, 2020

(86) PCT No.: PCT/EP2020/075545
§ 371 (c)(1),
(2) Date: Mar. 11, 2022

(87) PCT Pub. No.: WO2021/048405
PCT Pub. Date: Mar. 18, 2021

(65) Prior Publication Data
US 2022/0325731 A1    Oct. 13, 2022

(30) Foreign Application Priority Data
Sep. 13, 2019    (NL) .................................... 2023831

(51) Int. Cl.
*F04B 35/04*    (2006.01)
*F04B 17/03*    (2006.01)
(Continued)

(52) U.S. Cl.
CPC .................................. *F04B 17/03* (2013.01)

(58) Field of Classification Search
CPC .......... F04B 17/03; F04B 17/00; F04B 35/04; F04B 35/00; F04B 9/04; F04B 9/045;
(Continued)

(56) References Cited

U.S. PATENT DOCUMENTS 2,810,348 A * 10/1957 White ................... H02K 5/128
417/357
3,684,906 A *  8/1972 Lenz ...................... H02K 17/16
310/64
(Continued)

FOREIGN PATENT DOCUMENTS

DE          19504366 C1     6/1996
DE           3839689 C2 *   3/1998     .............. F04B 17/03
(Continued)

OTHER PUBLICATIONS

International Search Report and Written Opinion for Application No. PCT/EP2020/075545 dated Oct. 21, 2020.

*Primary Examiner* — Edgardo San Martin
(74) *Attorney, Agent, or Firm* — Michael Best & Friedrich LLP

(57) ABSTRACT

Pump unit (10) comprising an electrically driven hydraulic pump (4) for pressurising a hydraulic actuating system. The pump unit (10) comprises a hydraulic pump (4) in pump chamber (110) of a pump housing (11). The pump (4) is driven by an electric motor (3) which includes a motor rotor body (310) and an assembly of field coils (32) and magnets (33). A clearance (C) is provided around the motor rotor body (310) which is diverging in the axial direction from a small to a large diameter, such that a rotation of the motor rotor body (310) forces hydraulic fluid to flow towards the larger diameter. The fluid outlet (122) at the larger diameter of the clearance allows an exit of the hydraulic fluid, such that a fluid flow is generated which reduces hydraulic (Continued)

friction inside the pump unit to render an increase in pump capacity.

23 Claims, 4 Drawing Sheets

(51) Int. Cl.
*H02K 9/19* (2006.01)
*H02K 9/193* (2006.01)

(58) Field of Classification Search
CPC .. F04B 1/00; F04B 1/04; F04B 1/0456; F04B 1/10; F04B 1/107; F04B 1/1071; F04B 1/1072; H02K 1/32; H02K 9/19; H02K 9/193

See application file for complete search history.

(56) References Cited

U.S. PATENT DOCUMENTS

| | | | | |
|---|---|---|---|---|
| 5,360,322 A * | 11/1994 | Henein | ................ | H02K 7/083 |
| | | | | 417/313 |
| 9,453,507 B2 * | 9/2016 | Ghodsi-Kameneh | ..... | F04C 5/00 |
| 10,199,893 B2 * | 2/2019 | Okochi | .................... | H02K 1/32 |
| 10,461,599 B2 * | 10/2019 | Tamura | .................... | H02K 5/04 |
| 10,461,604 B2 * | 10/2019 | Paul | ........................ | H02K 9/19 |
| 10,598,177 B2 * | 3/2020 | Nieuwenhuis | ........ | F04B 1/0456 |
| 12,184,156 B2 * | 12/2024 | Choi | ........................ | H02K 9/19 |
| 2004/0136847 A1 * | 7/2004 | Arbogast | ................ | F04C 14/24 |
| | | | | 310/58 |
| 2014/0363319 A1 * | 12/2014 | Carboneri | ............ | F04C 29/045 |
| | | | | 417/372 |
| 2020/0195113 A1 * | 6/2020 | Nieuwenhuis | .......... | F04B 17/03 |

FOREIGN PATENT DOCUMENTS

| | | | | | |
|---|---|---|---|---|---|
| DE | 102015223631 A1 | * | 6/2017 | ............. | H02K 7/003 |
| DE | 102017109253 A1 | * | 10/2018 | ............. | F04D 13/06 |
| DE | 102023200316 A1 | * | 7/2024 | ............... | H02K 1/32 |
| GB | 2296296 A | * | 6/1996 | ............ | B60T 8/4022 |
| JP | 2014230393 A | * | 12/2014 | | |
| JP | 2015089316 A | * | 5/2015 | | |
| JP | 2019216555 A | * | 12/2019 | ............... | H02K 1/22 |
| JP | 2020114151 A | * | 7/2020 | | |
| WO | 02086320 A1 | | 10/2002 | | |
| WO | 2017192036 A1 | | 11/2017 | | |

* cited by examiner

PUMP UNIT WITH CONICAL MOTOR CHAMBER

BACKGROUND

WO2017192036 discloses a pump unit which has a very compact configuration. The pump unit is arranged for pressurising a hydraulic automotive actuating system, in particular for actuating a convertible roof system or a vehicle wheel suspension. The pump unit comprises a pump unit housing including a pump chamber for housing a piston pump and a motor chamber for housing a motor rotor of an electric drive. The motor rotor supports a plurality of magnets. The magnets are positioned opposite field coils for actuating the motor rotor. The piston pump has a pump rotor which is integral with the motor rotor. The pump rotor and the motor rotor form a one-piece item which contributes to the compactness of the pump unit. The compact pump unit allows an implementation in a narrow build-in space, while at the same time providing a required pump capacity.

A drawback of this compact pump unit is that in some applications, this pump unit is still not sufficient compact to provide a required pump capacity.

It is desired to provide a pump unit design providing more compactness while maintaining the same pump capacity, or in other words to provide an increase in pump capacity while maintaining the same compactness. Such a compact pump unit will be beneficial in a plurality of applications which include a hydraulically actuated system for moving components. Besides automotive applications, such a compact pump unit will also be beneficial in other fields, e.g. in a marine, medical or civil field. For example, in the marine field, the compact pump unit may be beneficial in a hydraulic actuating system for operating a marine device, like a marine door, hatch, lift, balcony, bulwarks, mast, mooring gangway etc. For example, in the medical field, the compact pump unit may be beneficial in a hydraulic actuating system for operating a medical device, like a medical tool, lift, trolley, chair or stretcher, e.g. an ambulance stretcher or dental chair, or a medical table, e.g. an operating, treatment or scanning table. For example, in the civil field, the compact pump unit may be beneficial in a hydraulic actuating system for operating a buildings door or hatch, e.g. a sliding garage door, porthole, skylight or shutter.

SUMMARY

According to the invention a pump unit for pressurising a hydraulic actuating system is provided.

The pump unit comprises a hydraulic pump. The hydraulic pump is housed in a pump chamber of a pump housing.

The pump unit comprises a reservoir in fluid communication with the hydraulic pump for containing a hydraulic liquid.

The pump unit comprises an electric motor for driving the hydraulic pump. The electric motor is at least partially housed in a motor chamber of a motor housing. The electric motor comprises a motor rotor. The motor rotor comprises a motor rotor body. The motor rotor body is driveable in rotation. Further, the electric motor comprises a plurality of field coils and a plurality of magnets. The magnets are disposed opposite the field coils. Preferably, the electric motor is a brushless DC motor in which the field coils are arranged stationary and the magnets are connected to the motor rotor body.

A clearance is provided in between the motor rotor and the motor housing. The clearance is provided in between an inner circumferential surface of the motor chamber and an outer circumferential surface of the motor rotor body.

According to the invention an improvement is obtained in that seen in the axial direction this clearance diverges. The clearance diverges from a small diameter to a large diameter. The clearance may be tapered and diverge linearly from a minimum to a maximum diameter. The improvement further foresees in providing a fluid outlet at a position of the large diameter of the clearance. Preferably, the fluid outlet is positioned at a maximum diameter of the clearance.

The divergence of the clearance means that a clearance volume differs in axial position. Seen in the axial direction, the diverging shape of the clearance causes a pressure difference between a position of the small diameter and a position of the large diameter of the clearance. Due to the diverging shape of the clearance and the presence of the fluid outlet, hydraulic fluid in the motor chamber is forced to flow from the small diameter to the large diameter of the clearance. At the large diameter, the hydraulic fluid exits the motor chamber and is discharged to the reservoir. Herewith, in operation, the presence of the diverging clearance causes a flow of hydraulic fluid towards the fluid outlet to allow the hydraulic fluid to be discharged from the motor chamber.

The diverging clearance and fluid outlet are advantageous to reduce an amount of hydraulic friction occurring in between the motor rotor and the inner circumferential surface of the motor chamber.

The pump unit may comprise any type of hydraulic pump, e.g. a gear or vane pump. The advantage of the friction reduction is especially beneficial in combination with a piston pump, in particular a rotary piston pump. The type of pump unit which includes a combination of a piston pump and an electric motor is vulnerable to hydraulic friction caused by a presence of hydraulic fluid in the above mentioned clearance. The hydraulic friction is caused by hydraulic fluid provided by a leakage flow originating from the piston pump. In operation of the pump unit, a leakage flow of hydraulic fluid will always occur due to manufacturing tolerances between movable components of the piston pump. A leakage flow of hydraulic fluid may pass along the pistons of the piston rotor and/or may pass along the pump stator towards the motor chamber. Leaked hydraulic fluid in the motor chamber subsequently enters the clearance and is swept with the motor rotor along the inner circumferential surface of the motor chamber which causes the hydraulic friction. As explained above, the diverging clearance and fluid outlet cause the hydraulic fluid to exit the clearance via the fluid outlet which advantageously reduces hydraulic friction. A reduction of hydraulic friction means a higher efficiency and an increase of available power of the pump unit for actuating a hydraulic actuating system.

In carrying out some pilot tests, the reduction of friction appeared to contribute to a significant increase of transferred power from the electric motor to the piston pump. Power losses caused by friction appeared to be reduced from about 130 W to about 30 W. By reducing the hydraulic friction, more power of the electric motor remains available for driving the piston pump. Advantageously, a smaller electric motor can be used to achieve the same pump capacity. Hence, according to the invention, a more compact pump unit can be provided.

In an embodiment of the pump unit according to the invention, the diverging clearance is formed by a tapered inner circumferential surface of the motor chamber. The motor rotor body preferably has a constant outer diameter. Preferably, the tapered inner circumferential surface comprises two tapered portions forming a conical shape when seen in a longitudinal section along the axial axis. Preferably, the inner circumferential surface of the motor chamber has a conical shape. A tip of the conical shape forms a maximum diameter. The fluid outlet is positioned at the tip of the conical shape to allow a hydraulic fluid to exit the motor chamber.

In an alternative embodiment of the pump unit according to the invention, the diverging clearance may be formed by a tapered outer circumferential surface of the motor rotor body. The inner circumferential surface of the motor chamber may have a constant inner diameter. The fluid outlet of the motor chamber may be positioned at the diverging clearance at the axial position of the minimum diameter of the motor rotor body. Also, in this manner, in operation of the pump unit, a pressure difference will cause a hydraulic fluid in the clearance to flow to the fluid outlet to exit the motor chamber.

In an embodiment of the pump unit according to the invention, the conical shape of the circumferential surface forming the diverging clearance has an obtuse angle of at least 160°. Preferably, the obtuse angle is at least 170° which contributes to a proper working of forcing the hydraulic fluid out of the clearance.

In an embodiment of the pump unit according to the invention, the fluid outlet extends in an inclined direction in a cross-sectional plane of the motor chamber. The fluid outlet may be formed by a borehole. The inclined fluid outlet is directed along with a rotational direction of the motor rotor, such that in operation hydraulic fluid is pushed into the fluid outlet by the rotating motor rotor. Preferably, the fluid outlet extends in a tangential direction with respect to the inner circumferential surface of the motor chamber. Advantageously, the tangential direction contributes to an improved discharge of hydraulic fluid away from the motor chamber.

In an embodiment of the pump unit according to the invention, the pump unit further comprises a gaseous inlet for introducing a gaseous medium, in particular an air inlet for introducing air. The air inlet is in fluid communication with the clearance in between the motor rotor and the inner circumferential surface of the motor chamber. The air inlet may be formed by a borehole extending from the motor chamber to external the motor housing. The air inlet contributes in discharging hydraulic fluid from the motor chamber. Advantageously, the air inlet may prevent an under pressure in the motor chamber which might affect a proper discharge of hydraulic fluid via the fluid outlet. The air inlet may be provided with a check valve to only allow a one directional flow into the motor chamber. Preferably, to prevent an entrance of hydraulic fluid into the air inlet, the air inlet extends in a tangential direction with respect to the inner circumferential surface of the motor chamber in an opposite direction to a motor rotor direction of rotation. This counter tangential orientation may prevent an exit of hydraulic fluid from the motor chamber through the air inlet. Additionally, the tangential orientation of the air inlet may reduce a resistance for an introduction of air into the motor chamber.

In an embodiment of the pump unit according to the invention, the reservoir has a reservoir wall which at least partially circumvents the motor housing. The reservoir wall encloses a reservoir space. The reservoir space is provided in between the motor housing and the reservoir wall. The fluid outlet is in fluid communication with the reservoir space to allow discharged hydraulic fluid to enter the reservoir space. Preferably, the reservoir wall fully circumvents the motor housing. At least, the reservoir wall covers the fluid outlet to allow hydraulic fluid to enter the reservoir space. Further, the reservoir space is in fluid communication with the hydraulic pump, in particular a piston pump, to allow the hydraulic pump to transfer hydraulic fluid to and fro reservoir.

In a further embodiment of the pump unit according to the invention, the fluid outlet of the motor chamber is formed by a passageway. The passageway may be formed by an aperture in the motor rotor circumferential outer surface, which aperture forms a fluid connection between the motor chamber and the reservoir space. The passageway is situated at a top region of the reservoir which circumvents the motor chamber. The passageway allows hydraulic fluid to exit the motor chamber and enter the reservoir, and at the same time a passageway allows air from the reservoir to enter the motor chamber. The fluid outlet and air inlet of the motor chamber are incorporated in the passageway. Advantageously, the configuration of the reservoir around the motor chamber contributes to the compactness of the pump unit.

In an embodiment of the pump unit according to the invention, the hydraulic pump, in particular a piston pump, is in the axial direction positioned in between the reservoir and the electric motor. The fluid outlet may be connected by a fluid conduit to the reservoir to transfer hydraulic fluid from the motor chamber to the reservoir. The fluid conduit may e.g. be formed by a flexible sleeve, pipeline or borehole. The hydraulic fluid may be pushed through the conduit during operation of the pump unit by the sweeping forces of the motor rotor. The pump unit may be embodied to be used in a predetermined orientation. Preferably, the reservoir has a reservoir space which is in operation only partly filled with hydraulic fluid, such that an air volume exists above a hydraulic fluid volume. Preferably, the reservoir has a reservoir inlet in fluid communication with the fluid outlet of the motor chamber which reservoir inlet is emerging in the air volume of the reservoir space. In operation, hydraulic fluid enters the reservoir space in the air volume and the hydraulic fluid moves under gravity to the hydraulic fluid volume. Advantageously, the air volume of the reservoir space provides a low resistance which allows hydraulic fluid originating from the motor chamber to enter the reservoir space.

In an embodiment of the pump unit according to the invention, the air inlet may be in fluid communication with the reservoir space by an air conduit. The air conduit emerges in an air volume of the reservoir space.

In an embodiment according to the invention, the hydraulic pump is a piston pump. In particular, the piston pump is a rotary piston pump. Such a piston pump is beneficial in obtaining a compact configuration of the pump unit. The piston pump is housed in a pump chamber of a pump housing. The piston pump comprises a pump stator which is stationary positioned inside the pump chamber. The pump stator has an elongated pump stator body. The elongated pump stator body extends in an axial direction of the pump unit. The elongated pump stator body defines an axial axis. The pump stator body includes at least an inlet and outlet channel for supplying and discharging a hydraulic fluid to and fro the reservoir. The reservoir is in fluid communication with the piston pump for containing the hydraulic fluid. Further, the piston pump comprises a pump rotor. The pump rotor is positioned around the pump stator body. The pump rotor has a pump rotor body which is driveable in a rotational direction about the axial axis. The pump rotor body includes a plurality of cylinder holes for each receiving a piston. Each piston is slidable relative to the pump rotor body in a radial direction. Further, the piston pump comprises an eccentric ring. The eccentric ring is positioned around the pump rotor body. The eccentric ring is eccentrically adjustable at an eccentricity with respect to the pump rotor body to provide a pump capacity. To produce a required pump capacity out of a small internal pump volume of the piston pump, the piston pump is typically operable at high angular speeds, e.g. at least 300 rpm.

In an embodiment of the pump unit according to the invention, the motor rotor and the pump rotor are incorporated into a common rotor which is a one-piece item. The common rotor includes a motor rotor portion and a pump rotor portion. Preferably, the common rotor is fully supported by the pump stator. Preferably, the pump stator is fixed to the pump housing as a cantilever. Preferably, the pump stator extends through the common rotor over at least half a length of the common rotor. Advantageously, the common rotor contributes to an optimal configuration of a compact pump unit.

In an embodiment of the pump unit according to the invention, the magnets are supported by the motor rotor body. Advantageously, in a preferred embodiment, the electric motor is a brushless motor. The magnets may be provided at an end face of the motor rotor body. Preferably, the motor rotor body has a motor rotor recess which motor rotor recess is open at the end face. The motor rotor recess is configured for receiving the field coils cooperating with the magnets of the motor rotor body. Preferably, the magnets are positioned on an inner circumferential surface of the motor rotor recess. Alternatively, the magnets may be positioned on a bottom surface of the motor rotor recess.

According to a further aspect of the invention, a second measure is provided to reduce hydraulic friction inside the pump unit. The reduction of hydraulic friction may contribute to an increase of pump capacity or as an equivalent a more compact configuration of the pump unit at the same pump capacity. The second measure relates to an embodiment of the pump unit in which the electric motor has magnets which are radially positioned with respect to the field coils. The magnets are radially spaced at a distance from the field coils. The plurality of magnets are positioned in a circular array around the plurality of field coils. A ring-shaped magnetic gap is provided in between the plurality of magnets and plurality of field coils. Similar to the working described above, a hydraulic fluid will be swept through the ring-shaped gap by the rotation of the motor rotor body which causes hydraulic friction. According to the second measure, the ring-shaped magnetic gap has a gap width of at least 1 mm.

Further, the invention relates to a hydraulic actuating system comprising a pump unit according to the invention.

Advantageously, the hydraulic actuating system may be self-contained which means that only an electrical connection is necessary. The electrical connection may consist of an electrical supply from the mains or a battery. The pump unit according to the invention may be beneficial to be installed in a mobile hydraulic actuating system, because pump unit may have a very compact lightweight configuration.

The pump unit may beneficially be battery operated. The mobile hydraulic actuating system including a battery allows an operation of relatively heavy loads by at least one hydraulic actuator which is controlled by the electrically driven pump unit. Therefore, the pump unit according to the invention may be of great benefit in mobile applications which urge for a small and lightweight actuating system, but at the same time require serious loads to be moved. In particular, a pump unit for pressurising an automotive actuating system is provided, which automotive actuating system is for example configured as a convertible roof system, boot lid, hood cover system or wheel suspension of the vehicle. Typically, the pump unit is compactly sized to be installed at narrow mounting spaces, e.g. within a compartment of a vehicle chassis. Examples of such applications in the medical, marine and civil field are mentioned above. An actuating system of an ambulance stretcher is a striking example of such a mobile actuating system which should be lightweight and powerful at the same time. Lightweight, because the ambulance stretcher should be carried by personnel, and at the same time powerful because it should move the load of a patient on the stretcher.

BRIEF DESCRIPTION OF THE DRAWINGS

The invention will be explained in more detail with reference to the appended drawings. The drawings show a practical embodiment according to the invention, which may not be interpreted as limiting the scope of the invention. The pump unit according to the invention is illustrated in a vehicle application, which should not be interpreted as being limited. The pump unit is also useful in all kind of other applications in other fields. Specific features may also be considered apart from the shown embodiment and may be taken into account in a broader context as a delimiting feature, not only for the shown embodiment but as a common feature for all embodiments falling within the scope of the appended claims, in which:

Figure 1:
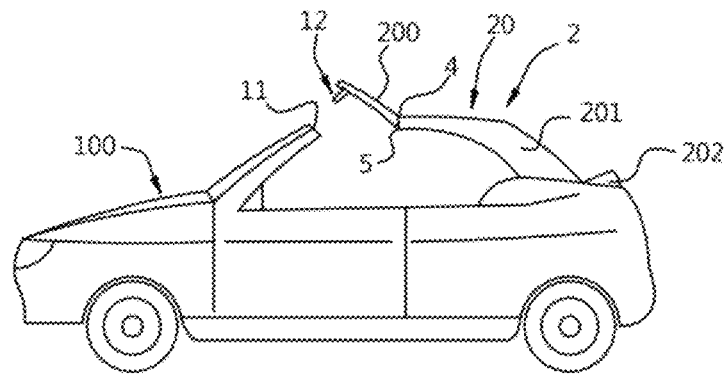
FIG. 1 shows a schematic side view of a vehicle provided with a convertible roof system.

In the drawings, identical reference signs are used to indicate identical or functionally similar components.

DETAILED DESCRIPTION

FIG. 1 discloses in a schematic view a vehicle 100. The vehicle 100 comprises an automotive actuating system for hydraulically actuating movable vehicle parts, like a sunroof, hood lid, boot lid, spoiler, convertible roof or a wheel suspension. As illustrated here, the vehicle 100 is provided with a convertible roof system 2 for selectively opening or covering a passenger space.

Here, the convertible roof system 2 has a convertible roof 20 which includes a front roof part 200. The roof part 200 is pivotally connected about a pivot axis to a remaining roof part 201 of the convertible roof 20. Here, the front roof part 200 is shown released from a front window frame. In a closed configuration of the convertible roof, the front roof part 200 is connected to the front window frame and locked by a locking member.

Figure 2:
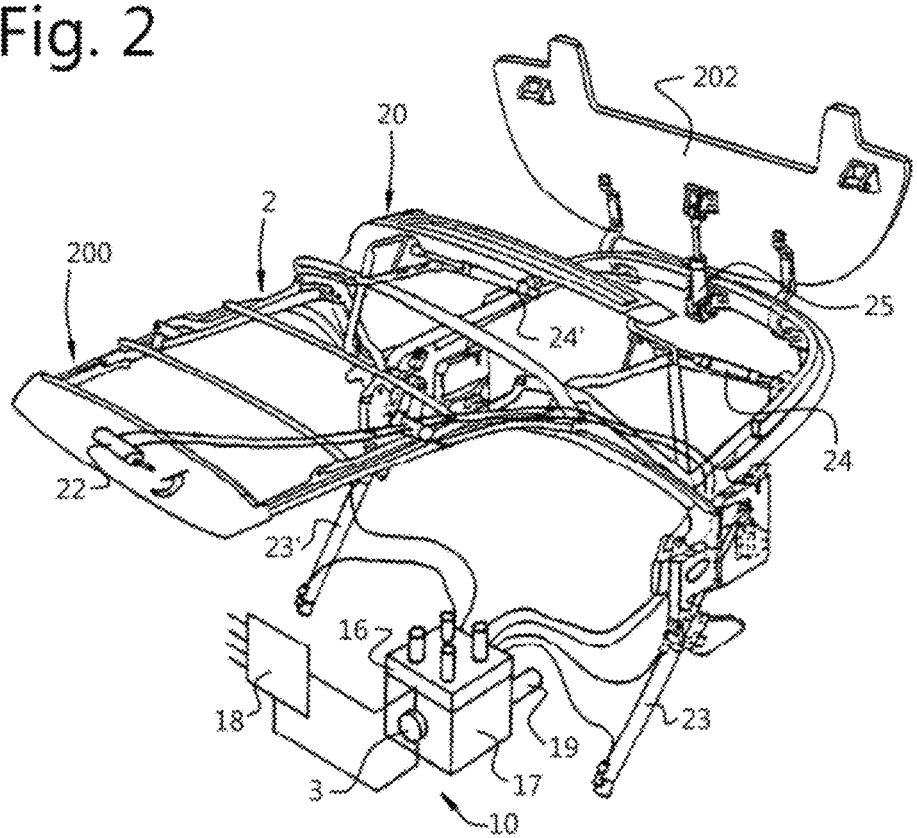
FIG. 2 shows a schematic view of the convertible roof system of FIG. 1 comprising a hydraulic actuating system which includes a pump unit for pressurising several cylinders.

FIG. 2 shows an embodiment of the convertible roof system 2 in further detail. The general mechanical structure of such a convertible roof system is well known in the art. FIG. 2 further shows a hydraulic actuating system 21. The hydraulic actuating system 21 is arranged to actuate the convertible roof 20, locking member and additionally a cover plate 202. The cover plate 202 is provided to cover a compartment of the vehicle 1 which compartment is configured to receive the convertible roof 20 when transformed into an open configuration.

The hydraulic actuating system 21 comprises two pairs of hydraulic cylinders 23, 23'; 24, 24' for moving the roof parts 200, 201 of the convertible roof 2. A hydraulic cylinder 25 is provided to move the cover plate 202 and a hydraulic cylinder 22 is provided to actuate the locking member. The cylinders 22; 23, 23'; 25, 25' are hydraulically connected by hydraulic conduits to a hydraulic pump unit 10.

As further shown in FIG. 2, the pump unit 10 has a pump unit housing 17. The pump unit housing 17 is block shaped. The pump unit 10 comprises a valve unit 16. The valve unit 16 is mounted to a mounting face which is here positioned at a top side of the pump unit housing 17. A control unit 18 is provided to control the pump unit 10. The control unit 18 is electrically connected to an electric motor 3 for driving a hydraulic pump 4 which is here a piston pump.

The electric motor 3 is connected to a front side F of the pump unit housing 17. Further, the pump unit 10 comprises a reservoir 19 for accumulating hydraulic liquid. The reservoir 19 is here positioned at a back B of the pump unit housing 17.

Figure 3:
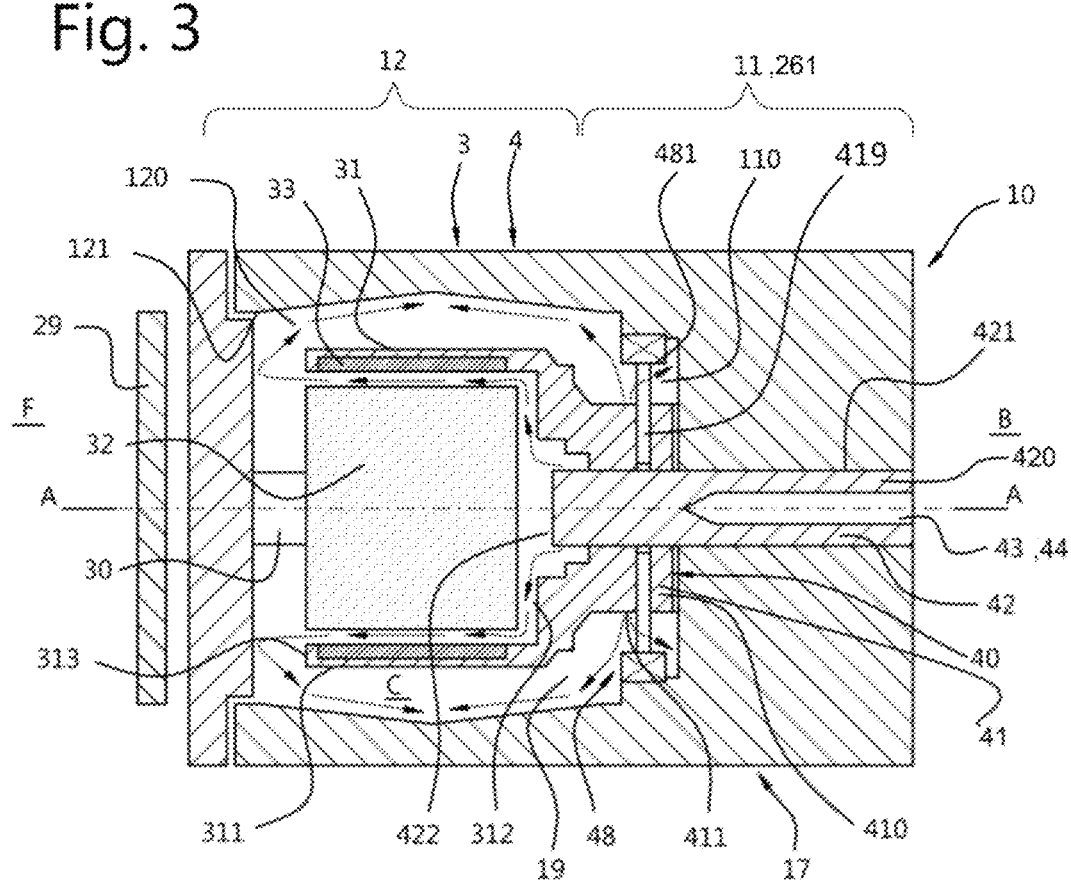
FIG. 3 shows an embodiment of a pump unit according to the invention in a longitudinal sectional view about an axial axis A-A, wherein the pump unit comprises an electric motor and a piston pump.

FIG. 3 shows the piston pump 4 which is arranged inside the pump unit housing 17 in a pump chamber 110. The pump chamber 110 is shown in further detail in FIG. 4. The pump chamber 110 is formed by an inner space which is configured for housing the piston pump 4.

Figure 5:
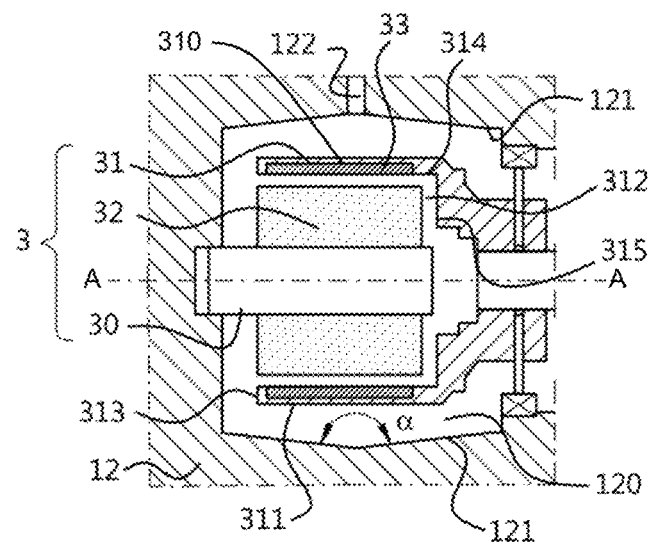
FIG. 5 shows an enlarged view of a motor chamber of the pump unit of FIG. 3 showing a clearance having a conical shape forming a clearance diverging towards a fluid outlet.

According to first aspect of the present invention, the pump unit 10 is improved by providing a diverging clearance C and a presence of a fluid outlet 122 emerging in the clearance C. FIG. 5 shows the clearance C and the fluid outlet 122 in further detail.

The presence of the diverging clearance C and fluid outlet 122 allows a hydraulic fluid flow to be discharged from the clearance. The discharge of hydraulic fluid advantageously contributes in reducing hydraulic friction. Due to the reduction of hydraulic friction, the pump unit itself is less power consuming and more power is available for generating a required pump capacity for the hydraulic actuating system 21. Advantageously, in comparison with the prior art, a smaller electric motor 3 can be used to obtain a same required pump capacity. Herewith, the pump unit can be configured more compact. The pump unit may comprise any type of hydraulic pump, e.g. a gear or vane pump. The advantage of the friction reduction is especially beneficial in combination with a piston pump, in particular a rotary piston pump.

FIG. 3 shows the pump unit 10 in a longitudinal sectional view about an axial axis A-A. The pump unit housing 17 has a portion which forms a pump housing 11 and a portion which forms a motor housing 12. The pump housing 11 is configured to receive components forming the piston pump 4. The motor housing 12 is configured to receive components of the electric motor 3.

Here, the piston pump 4 is a rotary piston pump 40. Such a type of piston pump is well known in the art. The rotary piston pump 40 has a pump rotor 41 which is rotatable around a pump stator 42.

The pump stator 42 has an elongated stator body 420 which extends along the axial direction A-A of the pump unit. The pump stator body 420 is beam shaped. The pump stator body 420 is stationary fixed to the pump unit housing 17. The pump stator body 4 is fixed at one end only. The pump stator body 420 is fixed as a cantilever. The pump stator body 420 has a proximal stator end 421 which is fixed to a bottom surface of a pump chamber 110. The pump stator body 420 has a free distal stator end 422 which is positioned in an inner space provided by the pump chamber 110. The pump stator body 420 includes at least two channels forming at least one inlet channel 43 and at least one outlet channel 44 for transferring hydraulic liquid.

The pump rotor 41 has a pump rotor body 410 which is rotationally connected to the pump stator body 420 of the pump stator 42. The pump rotor body 410 is co-axially positioned with respect to the pump stator 42. The pump stator 42 supports the pump rotor 41. Here, the pump rotor 41 is supported from one side only. The pump stator 42 provides a single sided support to the pump rotor 41 as the pump stator 42 is only fixed at the proximal stator end 421 to the pump housing.

As shown in FIG. 3 the motor rotor 31 and pump rotor 41 are here incorporated into a common rotor which is a one-piece item. The common rotor includes a motor rotor portion and a pump rotor portion. The common rotor is fully supported by the pump stator 42. Advantageously, the common rotor contributes to the compactness of the pump unit 10.

The pump rotor body 410 comprises several cylinder holes for each receiving a piston 419. The piston 419 has a longitudinal piston body. The piston body has a proximal piston end which is directed to stator body 420 and a distal piston end which is directed radially outwards to a ring-shaped element which surrounds the pump rotor body 410. The ring-shaped element is a so-called eccentric ring 48. The pump rotor body 410 is positioned inside the eccentric ring 48. The eccentric ring 48 is eccentric in radial position to obtain an eccentricity E which defines a pump capacity of the pump unit 10. As shown by the dashed line in FIG. 3 along an end face of the eccentric ring 48 facing to the front side of the pump unit at, the eccentric ring 48 delimits a pump chamber 110 from a motor chamber 120.

To reduce wear, the eccentric ring 48 is formed as a bearing. The bearing may be a plain bearing. Here, the eccentric ring 48 is formed by a ball bearing having an inner ring and an outer ring, wherein the inner ring is beared by ball bearings with respect to outer ring. The outer ring is stationary positioned and fixed to the pump housing 261 and the inner ring is rotatable positioned. The inner ring of the eccentric ring 48 is movable in rotation together with the inside positioned pump rotor 41.

The eccentric ring 48 comprises an inner bearing surface which serves as a running surface 481 for the distal ends of the pistons 419. The running surface 481 is positioned opposite an outer circumferential rotor surface 411 of the pump rotor body 410. The eccentric ring 48 is eccentrically positioned with respect to the pump rotor body 410. A ring-shaped intermediate space in between the outer circumferential rotor surface 411 and the inner running surface 481 is provided to allow in operation the pistons 419 holded by the pump rotor body 410 to move in a radial direction. Due to a present eccentricity E, a height of the intermediate space in between the outer circumferential rotor surface 411 and the running surface 481 is varying which will cause the pistons 419 to move in the radial direction when rotationally driving the pump rotor body 410. Radially inward moving pistons 419 will provide a pressure to the hydraulic liquid and will push hydraulic liquid through the outlet channel 44 and radially outward moving pistons 41 will provide an underpressure to the hydraulic liquid which will suck hydraulic liquid through the inlet channel 43. Herewith, the radially moving pistons 419 generate a pumping working to the hydraulic circuit.

Figure 4:
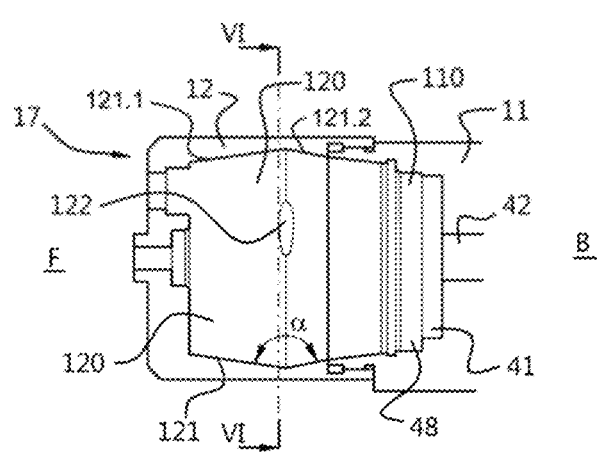
FIG. 4 shows a longitudinal sectional view of the motor chamber of FIG. 3.

FIG. 4 shows the pump chamber 110 and the motor chamber 120 of the pump unit housing 17 in a longitudinal sectional view. The pump unit housing 17 has portion forming the pump housing 11 and a portion forming the motor housing 12. The pump housing 11 is connectable to the motor housing 12. The pump housing 11 has a portion to be received in a recess at a back side B of the motor housing 12 to provide an inner space forming the pump chamber 110 and motor chamber 120.

As shown in FIG. 4, the motor chamber 120 has a motor chamber inner surface 121 which is tapered in the longitudinal direction. The motor chamber inner surface 121 extends in the axial direction from a small diameter to a large diameter. The tapering of the motor chamber inner surface 121 forms the diverging clearance C. A rotation of the motor rotor 31 will cause a hydraulic fluid in the clearance C to flow to a large diameter position.

Here, the motor chamber inner surface 121 has a first inner surface section 121.1 and a second inner surface section 121.2 which together form a conical motor chamber inner surface 121. Each inner surface section 121.1, 121.2 is tapered. The first inner surface section 121.1 is tapered in mirror symmetry with the second inner surface section 121.2. The conical shape of the circumferential surface 121 has an obtuse angle α at a tip of at least 160°, in particular at least 170°.

As illustrated by arrows in FIG. 5, in operation, the conical shape causes a hydraulic fluid to flow towards a tip of the conical shape. The clearance C in between circumferential inner surface 121 and the motor rotor 31 diverges from a small diameter at a side edge of the motor chamber 120 to a large diameter in a middle region of the clearance C. In operation, centrifugal forces and a pressure difference cause the hydraulic fluid to flow to the large diameter. The fluid outlet 122 is positioned at the large diameter at the tip of the conical shape. The fluid outlet 122 is formed by a channel which is inclined, in particular tangential, to the inner circumferential surface 121. In operation, the hydraulic fluid will be forced through the fluid outlet and discharged away from the motor chamber 120. Advantageously, the discharge of hydraulic fluid reduces an occurring hydraulic friction in the clearance C.

FIG. 5 shows the electric motor 3 inside the motor chamber 120 in further detail. Here, the electric motor 3 is a brushless DC motor. A DC motor is beneficial, because of its relatively long lifetime without intervening servicing. The electric motor 3 has a motor rotor 31. The motor rotor 31 has a motor rotor body 310. The motor rotor body 310 is cylindrically shaped an elongated. The motor rotor body 310 extends along the axial axis A-A. The motor rotor body 310 has an outer circumferential surface 311 and a motor rotor end face 313.

Further, the electric motor 3 comprises a plurality of field coils 32. The field coils 32 are DC field coils which in operation generate a magnetic field. The field coils 32 are positioned opposite a plurality of magnets 33 which are supported by the motor rotor body 310. The plurality of magnets 33 are disposed in a circular array. The magnets 33 may be positioned on the motor rotor end face 313. Preferably, as shown, the magnets 33 are positioned at a motor rotor inner circumferential surface around the field coils 32. The field coils 32 are radially positioned inside the circular array of magnets 33. The field coils 32 are positioned inside a motor rotor recess 312. The motor rotor recess 312 extends from the motor rotor end face 313 along the axial axis A-A. The motor rotor recess 312 has a recess depth for receiving the field coils 32. The motor rotor recess 312 provides a motor rotor inner circumferential surface 314 and a motor rotor inner bottom surface 315. Here, the magnets 33 are positioned on the motor rotor inner circumferential surface 314. A magnetic gap exists in between the magnets 33 and the opposite positioned field coils 32.

According to a second aspect of the invention, this magnetic gap has a gap width of at least 1 mm, in particular at least 2 mm to reduce hydraulic friction in between the field coils 32 and motor rotor 31.

Figure 6:
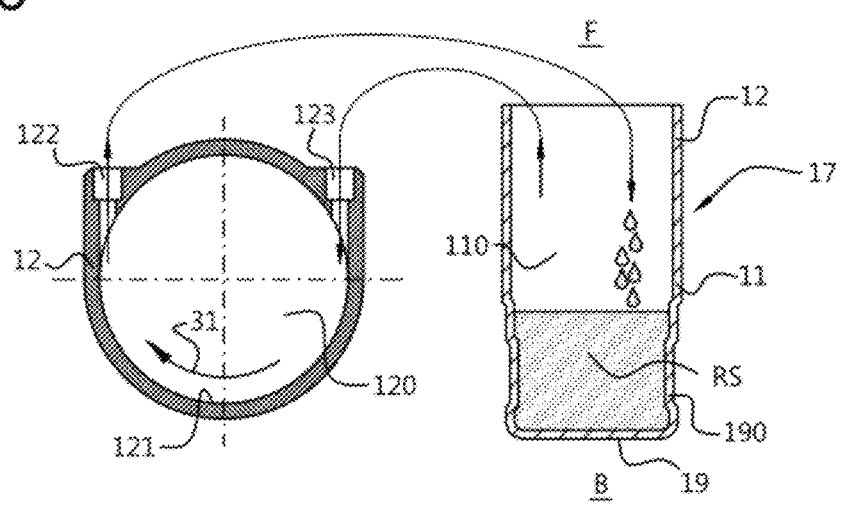
FIG. 6 shows a cross-sectional view of the motor chamber showing a fluid outlet and an air inlet emerging in the motor chamber and in fluid communication with a reservoir of the pump unit.

FIG. 6 shows in a left drawing a cross-sectional view of the motor chamber 120 in the motor housing 12 as shown in FIG. 4. An arrow indicates a rotation of the motor rotor 31 inside the motor chamber 120. Due to the rotation of the motor rotor 31, a hydraulic fluid present in the motor chamber 120 will be conveyed by the motor rotor 31 towards the fluid outlet 122. The fluid outlet 122 is tangential to the inner circumferential surface 121 of the motor chamber 120. The fluid outlet 122 is formed by a fluid channel having a channel end opening emerging at the motor chamber inner surface 121. The fluid channel tangentially extends in a direction along with the rotational direction of the motor rotor 31. The hydraulic fluid is pushed through the fluid outlet 122 by the rotation of the motor rotor 31 and discharged from the motor chamber 120.

In the left drawing, FIG. 6 further shows an air inlet 123. The air inlet 123 is configured to allow an air entrance into the motor chamber 120. A discharge of hydraulic fluid from the motor chamber may cause an under pressure. The air inlet 123 allows an air entrance to compensate the under pressure. The air inlet 123 may be provided by any air gap or any air channel positioned anywhere to emerge at the motor chamber 120. Here, the air inlet 123 is formed by an air channel. The air inlet 123 is positioned opposite the fluid outlet 122. The fluid outlet 122 and the air inlet 123 are in mirror symmetry with respect to a central axis of the motor chamber 120. The air channel forming the air inlet 123 has an air channel end opening emerging at the motor chamber inner surface 121. The air channel tangentially extends in a direction counter the rotation of the motor rotor 31. The air channel forming the air inlet 123 extends in a direction opposite the rotational direction of the motor rotor 31. The orientation of the air inlet 123 prevents hydraulic fluid from the motor chamber 120 enter into the air inlet.

FIG. 6 further shows in a right drawing a longitudinal sectional view of the pump unit housing 17 in an upright orientation. The front side of the pump unit is upwards directed. Under gravity, a hydraulic fluid will downwardly flow to a reservoir 19 at a bottom region of the pump unit. The reservoir 19 is in fluid communication with the pump chamber 110 and motor chamber 120 of respectively the pump housing 11 and motor housing 12. The hydraulic fluid may flow from the pump chamber 110 and motor chamber 122 a reservoir space RS of the reservoir 19. The reservoir space RS is enclosed by a reservoir wall 190. The reservoir space RS contains a fluid volume. The piston pump for ease in fluid communication with the reservoir space RS to extract or discharge hydraulic fluid. Hydraulic fluid from the fluid volume of the reservoir is an transferred to-and-fro the piston pump 4.

Figure 7:
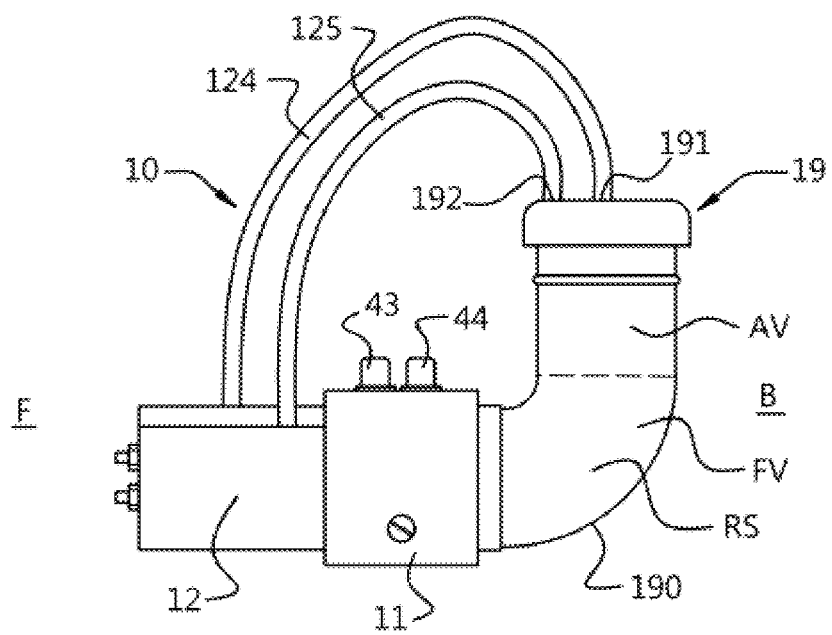
FIG. 7 shows a side view of a pump unit with a reservoir in fluid communication with the motor chamber, in which a pump housing is situated in between the reservoir and a motor housing.

FIG. 7 shows in a side view of an embodiment of a pump unit 10 according to the invention. The pump unit 10 has a hydraulic pump 4 in a pump chamber 110 inside a pump housing 11 and an electric motor 3 in a motor chamber 120 inside a motor housing 12. A reservoir 19 is mounted at a back side B of the pump housing. The reservoir 19 has a reservoir space RS for containing a fluid volume FV which is in fluid communication with the piston pump 4. The reservoir space RS further contains an air volume AV situated above the fluid volume FV. At a top region, the reservoir 19 has a reservoir inlet 191 and optionally a reservoir outlet 192. The reservoir inlet 191 is via a fluid conduit 124 in fluid communication with the fluid outlet 122 of the motor housing 12. The reservoir inlet 191 is arranged for transferring hydraulic fluid via the fluid conduit 124 from the motor chamber 120 inside the motor housing 11 to reservoir space RS of the reservoir 19. The reservoir outlet 192 is via an air conduit 125 in fluid communication with the air inlet 123 of the motor housing 12. The reservoir outlet 192 is arranged for transferring air from the reservoir space RS to the motor chamber 120.

Figure 8:
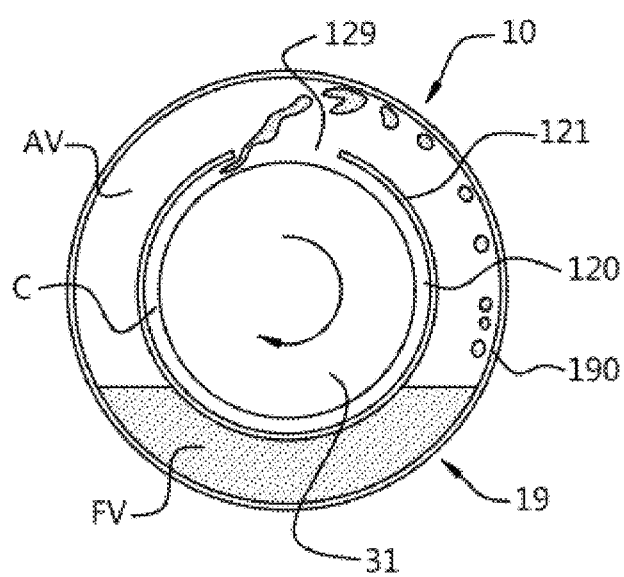
FIG. 8 shows an alternative embodiment of the pump unit having a reservoir circumventing the motor housing and having a passageway which serves both as an air inlet and a fluid outlet.

FIG. 8 shows a schematic cross-sectional view across a motor housing 12 of a preferred embodiment the pump unit 10 according to the invention. Instead of a reservoir at an opposite side of a pump housing, here, a reservoir 19 is formed around the motor housing 12 by a reservoir wall 190. The reservoir wall 190 circumvents the motor housing 12 and encloses a reservoir space RS. The reservoir space RS surrounds the motor housing 12 and in operation contains a fluid volume FV and an air volume AV. The pump unit 10 is to be used in an upright orientation in which the air volume AV is situated above the fluid volume FV. An arrow shows the rotational direction of the motor rotor 31 inside a motor chamber 120 of the motor housing 12. In operation, the clearance C in between the motor rotor 31 and the motor chamber inner surface 121 will contain hydraulic fluid. Due to the rotation of the motor rotor 31, the hydraulic fluid will be swept along the motor chamber inner surface 121. A passageway 129 is provided at a top region of the motor chamber 120. The passageway 129 emerges at the motor chamber inner surface 121 and provides a fluid communication in between the reservoir 19 and the motor chamber 120. The passageway 129 is arranged for both discharging hydraulic fluid from the motor chamber 122 the reservoir 19 and supplying air to the motor chamber. Advantageously, this configuration of the reservoir 19 around the motor housing 12 further contributes to a compactness of the pump unit 10.

The detailed description above with reference to the figures provide exemplary embodiments of the pump unit according to the invention. Numerous variants are possible in addition to these embodiments. For example, in a variant of the illustrated embodiments, the pump unit may comprise another type of hydraulic pump, e.g. a gear pump or a vane pump instead of a piston pump. In a variant, the magnets of the motor rotor may be positioned at a motor rotor end face and the field coils may be axially positioned opposite the magnets. In a variant, the motor rotor and the pump rotor may be formed by separate items connected by a linkage member. In a variant, an integral common rotor including the motor rotor and the pump rotor may be journalled at both rotor ends. The clearance diverging from a small diameter to a large diameter is in the figures formed by a conical shape of an inner circumferential surface of a motor chamber and a straight outer surface of a motor rotor. A diverging clearance can be obtained in several manners. The diverging clearance can e.g. be formed by tapered inner and outer surfaces which extend in parallel from a small to a large diameter. Alternatively, the clearance may be formed by a straight inner circumferential surface of a motor chamber and a tapered outer circumferential surface of a motor rotor. Due to rotor rotation, hydraulic fluid will be forced to the large diameter to the fluid outlet of the motor chamber.

Although the present invention has been described in detail, it will be apparent to those skilled in the art that various changes and modifications can be made without departing from the scope of the invention as hereinafter claimed. It is intended that all such changes and modifications be encompassed within the scope of the present disclosure and claims. It should be noted that measures according to the invention and in particular measures referred to in the dependent claims are considered as being patentable in their own right and separately from measures referred to in other independent or dependent claims. These measures may, for example, be the subject of divisional patent applications, with these measures being defined independently of the measures currently included in the independent claims or other dependent claims. This applies in particular to the abovementioned measure, wherein the magnetic gap has a gap width of at least 1 mm, in particular at least 2 mm to reduce hydraulic friction in between the field coils and motor rotor.

Thus, the invention provides a pump unit comprising an electrically driven piston pump for pressurising a hydraulic actuating system. The piston pump has a pump rotor inside a pump chamber. The pump rotor is driven by an electric motor which includes a motor rotor body and an assembly of field coils and magnets. A clearance is provided around the motor rotor body which is diverging in the axial direction from a small to a large diameter, such that a rotation of the motor rotor body forces hydraulic fluid to flow towards the larger diameter. The fluid outlet at the larger diameter of the clearance allows an exit of the hydraulic fluid, such that a fluid flow is generated which reduces hydraulic friction inside the pump unit to render an increase in pump capacity.

| Reference signs list: | |
|---|---|
| 100 vehicle | 110 pump chamber |
| 2 convertible roof system | 12 motor housing |
| 20 convertible roof | 120 motor chamber |
| 200 roof part | 121 motor chamber inner surface |
| 201 remaining roof part | 122 fluid outlet |
| 202 cover plate | 123 air inlet |
| 21 hydraulic actuating system | 124 fluid conduit |
| 22 hydraulic cylinder | 125 air conduit |
| 23, 23' hydraulic cylinder | 129 passageway |
| 24, 24' hydraulic cylinder | C clearance |
| 25 hydraulic cylinder | 16 valve unit |
| 10 pump unit | 17 pump unit housing |
| F front side | 18 control unit |
| 11 pump housing | 19 reservoir |
| 190 reservoir wall | 4 hydraulic pump |
| 191 reservoir inlet | 40 rotary piston pump |
| 192 reservoir outlet | 41 pump rotor |
| RS reservoir space | 410 pump rotor body |
| AV air volume | 411 pump rotor outer circumferential surface |
| FV fluid volume | |
| 3 electric motor | 419 piston |

-continued

Reference signs list:

| | |
|---|---|
| 30 motor stator | 42 pump stator |
| 31 motor rotor | 420 pump stator body |
| 310 motor rotor body | 421 pump stator proximal end |
| 311 motor rotor outer circumferential surface | 422 pump stator distal end |
| | 43 inlet channel |
| 312 motor rotor recess | 44 outlet channel |
| 313 motor rotor end face | 48 eccentric ring |
| 314 motor rotor inner circumferential surface | 481 running surface |
| | 5 ring actuator |
| 315 motor rotor inner bottom surface | |
| 32 field coil | |
| 33 magnet | |

What is claimed is:

1. A pump unit for pressurising a hydraulic actuating system, wherein the pump unit comprises:
a hydraulic pump, and a pump housing including a pump chamber for housing the hydraulic pump;
an electric motor for driving the hydraulic pump and a motor housing including a motor chamber for housing the electric motor; and
a reservoir in fluid communication with the hydraulic pump for containing a hydraulic fluid;
wherein the electric motor comprises:
a motor rotor, wherein the motor rotor comprises a motor rotor body;
a plurality of field coils; and
a plurality of magnets which are disposed opposite the field coils for rotationally driving the motor rotor body;
wherein a clearance is provided in between an inner circumferential surface of the motor chamber and an outer circumferential surface of the motor rotor body,
wherein the clearance is diverging in the axial direction from a small diameter to a large diameter, and
wherein a fluid outlet is provided at a position of the large diameter of the clearance, such that in operation of the pump unit a hydraulic fluid in the clearance is caused to flow towards the fluid outlet to exit the motor chamber.

2. The pump unit according to claim 1, wherein the clearance is formed by a tapered inner circumferential surface of the motor chamber and/or or a tapered outer circumferential surface of the motor rotor body.

3. The pump unit according to claim 1, wherein the circumferential surface of the motor chamber or motor rotor body forming a diverging shape of the clearance has a conical shape when seen in a longitudinal section along the axial axis, wherein the fluid outlet is positioned at a tip of the conical shape.

4. The pump unit according to claim 3, wherein a tip of the conical shape of the circumferential surface has an obtuse angle of at least 160°, or at least 170°.

5. The pump unit according to claim 3, wherein the fluid outlet extends in, with respect to the inner circumferential surface of the motor chamber, at least one of (i) an inclined direction and (ii) a tangential direction.

6. The pump unit according to claim 3, wherein an air inlet is in fluid communication with the clearance to allow an entrance of air into the motor chamber.

7. The pump unit according to claim 6, wherein the air inlet extends in a tangential direction with respect to the inner circumferential surface of the motor chamber.

8. The pump unit according to claim 6, wherein the air inlet is provided with a check valve to only allow a one directional flow into the motor chamber.

9. The pump unit according to claim 3, wherein the reservoir has a reservoir wall which at least partially circumvents the motor housing and encloses a reservoir space, wherein the fluid outlet is in fluid communication with the reservoir space.

10. The pump unit according to claim 9, wherein the reservoir wall fully circumvents the motor housing.

11. The pump unit according to claim 9, wherein the fluid outlet is formed by a passageway at a top region of the reservoir, which passageway both allows an exit of hydraulic fluid from and an entrance of air into the motor chamber.

12. The pump unit (10) according to claim 6, wherein the hydraulic pump is positioned in between the reservoir and the electric motor, wherein the fluid outlet is in fluid communication with a reservoir space of the reservoir by a fluid conduit, which reservoir space contains, in operation, an air volume and a hydraulic fluid volume and which fluid conduit emerges into said air volume.

13. The pump unit according to claim 12, wherein the air inlet is in fluid communication with the air volume of the reservoir space by an air conduit.

14. The pump unit according to claim 3, wherein the hydraulic pump is a piston pump comprising:
a pump stator which is stationary positioned inside the pump chamber, which pump stator has an elongated pump stator body extending in an axial direction defining an axial axis, in which the pump stator body includes at least an inlet and outlet channel in fluid communication with the reservoir;
a pump rotor positioned around the pump stator body, which pump rotor has a pump rotor body which is driveable in a rotational direction about the axial axis, wherein the pump rotor body includes a plurality of cylinder holes for each receiving a piston being slidable relative to the pump rotor body in a radial direction; and
an eccentric ring positioned around the pump rotor body, in which the eccentric ring is eccentric at an eccentricity with respect to the pump rotor body to provide a pump capacity.

15. The pump unit according to claim 14, wherein the motor rotor and the pump rotor are incorporated into a common rotor which is a one piece item including a motor and a pump rotor portion and wherein the common rotor is fully supported by the pump stator.

16. The pump unit according to claim 3, wherein the magnets are supported by the motor rotor, wherein the magnets of the electric motor are positioned on an inner circumferential surface of a motor rotor recess which motor rotor recess is open at a motor rotor end face of the motor rotor body for receiving the field coils and wherein the plurality of field coils are positioned inside the motor rotor recess.

17. The pump unit according to claim 16, wherein the magnets are radially spaced at a distance from the field coils to form a ring-shaped magnetic gap in between the magnets and field coils, wherein the magnetic gap has a gap width of at least 1 mm.

18. A hydraulic actuating system comprising a pump unit according to claim 3.

19. A vehicle suspension comprising a hydraulic actuating system according to claim 18, wherein the vehicle suspension comprises a linkage and at least one hydraulic cylinder for actuating a link of the linkage to allow an active control of the vehicle suspension.

20. A convertible roof system comprising a hydraulic actuating system according to claim 17, wherein the convertible roof system comprises a convertible roof including a roof part which is movable with respect to a remaining roof part (201).

21. A vehicle comprising a hydraulic actuating system according to claim 18.

22. A medical device comprising a hydraulic actuating system according to claim 18, wherein the medical device is self-contained medical device needing an electrical connection for operation, the self-contained medical device being a battery operated mobile device including one of an adjustable medical lift, a trolley, a stretcher, a table or a chair.

23. A marine device comprising a hydraulic actuating system according to claim 18, wherein the marine device is a self-contained marine device including one of a marine door actuator, a marine hatch actuator, a marine balcony actuator, a marine bulwarks actuator, or a marine mast actuator.

* * * * *